United States Patent [19]

Fushimi et al.

[11] Patent Number: 5,367,027
[45] Date of Patent: Nov. 22, 1994

[54] CURABLE RESIN COMPOSITION, A COATING COMPOSITION AND A PROCESS FOR FORMING A COATING FILM

[75] Inventors: Akira Fushimi, Ikoma; Tsuneyoshi Hisai, Hirakata; Kazuhiko Takeoka, Kawanishi; Yoshitaka Okude, Hirakata, all of Japan

[73] Assignee: Nippon Paint Co., Ltd., Osaka, Japan

[21] Appl. No.: 95,834

[22] Filed: Jul. 22, 1993

[30] Foreign Application Priority Data

Jul. 22, 1992 [JP] Japan .................. 4-195129

[51] Int. Cl.$^5$ .................. C08L 37/00; C08L 35/02; C08L 33/14
[52] U.S. Cl. .................. 525/208; 525/207; 525/194; 525/223; 525/195
[58] Field of Search .................. 525/208, 207, 194, 195

[56] References Cited

U.S. PATENT DOCUMENTS

| | | |
|---|---|---|
| 2,977,334 | 3/1961 | Zopf, Jr. et al. . |
| 3,399,109 | 8/1968 | Zimmerman et al. . |
| 3,528,935 | 9/1970 | Marion et al. . |
| 3,888,943 | 6/1975 | Labana et al. . |
| 3,914,333 | 10/1975 | Labana et al. . |
| 3,959,405 | 5/1976 | Labana et al. . |
| 4,238,577 | 12/1980 | Arendt . |
| 4,242,243 | 12/1980 | Antonelli et al. . |
| 4,374,954 | 2/1983 | Labana et al. . |
| 4,871,806 | 10/1989 | Shalati et al. . |
| 5,057,555 | 10/1991 | White et al. . |
| 5,093,391 | 3/1992 | Barsotti et al. . |
| 5,270,392 | 12/1993 | Okude et al. . |

FOREIGN PATENT DOCUMENTS

| | | |
|---|---|---|
| 02045577 | 2/1990 | Japan . |
| 03287650 | 12/1991 | Japan . |

Primary Examiner—Carman J. Seccuro, Jr.
Attorney, Agent, or Firm—Townsend & Banta

[57] ABSTRACT

The present invention provides a curable resin composition which provides cured film having not only excellent acid resistance but also good weather resistance and good mar resistance. The curable resin composition comprises (a) a hydroxyl and carboxyl group containing polymer, (b) a carboxyl and carboxylate group containing polymer, and (c) a hydroxyl and epoxy group containing polymer.

17 Claims, No Drawings

CURABLE RESIN COMPOSITION, A COATING COMPOSITION AND A PROCESS FOR FORMING A COATING FILM

FIELD OF THE INVENTION

The present invention relates to a curable resin composition which is suitable for automotive top coating paint and coil coating paint.

BACKGROUND OF THE INVENTION

Top coating paint for automobiles generally contains, as a film forming binder, a combination of a hydroxyl group containing polymer and a melamine curing agent. The cured film obtained from the melamine curing system, however, has poor acid resistance and is damaged by acid rain which has recently become one of serious problems. The damage of the film provides poor appearance.

In order to overcome the above mentioned defects, the present inventors have proposed novel coating compositions without employing the melamine curing agent in Japanese Kokai Publications 45577/1990, 287650/1991. The similar coating compositions are also disclosed in U.S. Pat. Nos. 2,977,334 (to Zopf et al.), 3,399,109 (to Zimmerman et al.) and 3,528,935 (to Marion et al.). The proposed coating composition cures by means of the reaction of acid with epoxy and therefore has good acid resistance and sufficient weather resistance for an automobile top coating application.

However, these coatings have a problem that they are easily brushed by a car washing machine. If degree of crosslinking is raised in order to impart good mar resistance at the mechanical car washing in this curing system, the resulting film has poor elongation and is stiff and brittle. The stiff and brittle film has poor mar resistance and is easily damaged by scratch. It is therefore difficult to use the proposed coating compositions providing merely a high degree of crosslinking as a top coating paint for the automobiles, because such a composition provide poor mar resistance at the mechanical car washing. It is desired to develop top coating paint which has not only excellent acid resistance but also high mar resistance.

SUMMARY OF THE INVENTION

The present invention provides a curable resin composition which provides cured film having not only excellent acid resistance but also good weather resistance and good mar resistance because of its high breaking strength. The present invention also provides for forming a coating film using the resin composition.

The present invention thus provides a curable resin composition comprising:
(a) 5 to 50% by weight of a carboxyl and hydroxyl group containing polymer prepared by copolymerizing, (i) 20 to 100% by weight of an ethylenically unsaturated monomer mixture comprising (1) an ethylenically unsaturated monomer having a carboxyl group and (2) a hydroxyalkyl (meth)acrylate of the formula:

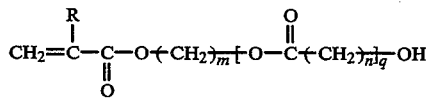

wherein, R represents a hydrogen atom or a methyl group, m represents an integer of 2 to 8, n represents an integer of 3 to 7 and q represents an integer of 0 to 4, said monomer mixture (i) being prepared by mixing and reacting the hydroxyalkyl (meth)acrylate with an anhydride group containing compound in an molar ratio of hydroxyl group to anhydride group of 1/0.9 to 1/0.5, and optionally (ii) 0 to 80% by weight of a copolymerizable ethylenically unsaturated monomer;

(b) 20 to 60% by weight of a carboxyl and carboxylate group containing polymer prepared by reacting, (i) an anhydride group containing polymer prepared by copolymerizing 15 to 40% by weight of (1) an ethylenically unsaturated monomer having an anhydride group and 60 to 85% by weight of (2) the other copolymerizable ethylenically unsaturated monomer, with (ii) a hydroxyl group containing compound having 1 to 12 carbon atoms in a molar ratio of anhydride group to hydroxyl group of 1/1.5 to 1/1; and (c) 30 to 60% by weight of a hydroxyl and epoxy group containing polymer prepared by copolymerizing, (i) 5 to 40% by weight of said hydroxyalkyl (meth)acrylate, (ii) 10 to 60% by weight of an ethylenically Unsaturated monomer having an epoxy group, and optionally (iii) 0 to 85% by weight of the other copolymerizable ethylenically unsaturated monomer.

The present invention also provides a process for forming a coating on a substrate comprising: coating a water-borne or solvent-borne color base paint on a primed or intercoated substrate; coating a clear paint thereon without curing the base paint layer; and baking both the base and clear coating layers to cure; an improvement being present in that the clear paint comprising the coating composition comprising:

(a) 5 to 50% by weight of a carboxyl and hydroxyl group containing polymer prepared by copolymerizing, (i) 20 to 100% by weight of an ethylenically unsaturated monomer mixture comprising (1) an ethylenically unsaturated monomer having a carboxyl group and (2) a hydroxyalkyl (meth)acrylate of the formula:

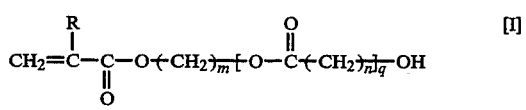

wherein, R represents a hydrogen atom or a methyl group, m represents an integer of 2 to 8, n represents an integer of 3 to 7 and q represents an integer of 0 to 4, said monomer mixture (i) being prepared by mixing and reacting the hydroxyalkyl (meth.)acrylate with an anhydride group containing compound in an molar ratio of hydroxyl group to anhydride group of 1/0.9 to 1/0.5, and optionally (ii) 0 to 80% by weight of a copolymerizable ethylenically unsaturated monomer;

(b) 20 to 60% by weight of a carboxyl and carboxylate group containing polymer prepared by reacting, (i) an anhydride group containing polymer prepared by copolymerizing 15 to 40% by weight of (1) an ethylenically unsaturated monomer having an anhydride group and 60 to 85% by weight of (2) the other copolymerizable ethylenically unsaturated monomer, with (ii) a hydroxyl group containing compound having 1 to 12 carbon atoms in a molar ratio of anhydride group to hydroxyl group of 1/1.5 to 1/1; and (c) 30 to 60% by weight of a hydroxyl and epoxy group containing polymer prepared by copolymerizing, (i) 5 to 40% by weight of said hydroxyalkyl (meth)acrylate, (ii) 10 to 60% by weight of an ethylenically unsaturated monomer having an epoxy group, and optionally (iii) 0 to 85% by weight of the other copolymerizable ethylenically unsaturated monomer.

DETAILED DESCRIPTION OF THE INVENTION

The carboxyl and hydroxyl group containing polymer (a) employed in the curable resin composition of the present invention is a copolymer of at least two ethylenically unsaturated monomers.

The first monomer is an ethylenically unsaturated monomer having a carboxyl group, which is prepared by reacting a hydroxyalkyl (meth)acrylate of the formula:

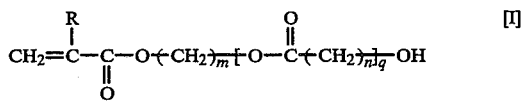

wherein, R represents a hydrogen atom or a methyl group, m represents an integer of 2 to 8, preferably 2 to 6, n represents an integer of 3 to 7, preferably 3 to 5 and q represents an integer of 0 to 4, preferably 0 to 2, with an anhydride group containing compound in an equivalent amount of hydroxyl group to anhydride group. The first monomer is used for introducing carboxyl groups into the resulting hydroxyl and carboxyl group containing polymer (a).

A hydroxyalkyl chain of the hydroxyalkyl (meth)acrylate of the present invention has 4 to 20, more preferably 4 to 10 carbon atoms. If the hydroxyalkyl chain is shorter than 4 carbon atoms, too dense crosslinking may be provided and the mar resistance of the resulting coating may be lowered, because the resulting coating may become too hard. If the hydroxyalkyl chain is longer than 20 carbon atoms, too coarse crosslinking may be provided and the physical strength of the resulting coating may be lowered.

Specific examples of the hydroxyalkyl (meth)acrylate include 4-hydroxybutyl acrylate, 4-hydroxybutyl methacrylate, 6-hydroxyhexyl acrylate and 6-hydroxyhexyl methacrylate and ε-caprolactone reactants therewith. These compounds are commercially available. For example, 4-hydroxybutyl acrylate is available as a trade name of "4HBA" form Mitsubishi Kasei K. K. The ε-caprolactone reactants therewith are commercially available from Daicel Chemical Industries, Ltd as a trade name of "Placcel FM-1" and "Placcel FA-1". These compounds may otherwise be prepared by esterification of (moth)acrylic acid with large excess amount of diols such as, for example, 1,4-hexane diol and 1,6-hexane diol.

The anhydride group containing compound employed in the present invention may be any compound which provides a carboxyl functionality by reacting with a hydroxyl group. The anhydride group containing compound has preferably 8 to 12, more preferably 8 to 10 carbon atoms, and preferably has saturated or unsaturated cyclic group, because such a compound may impart an improved compatibility to the resulting polymer. Specific examples of the preferred anhydride group containing compound include hexahydrophthalic anhydride, phthalic anhydride, 4-methylhexahydrophthalic anhydride, tetrahydrophthalic anhydride and trimellitic anhydride.

The half esterification reaction is carried out according to any process known to the art, for example, at a temperature of from room temperature to 120° C. It is preferred that an excess of hydroxyalkyl (meth)acrylates used in the half esterification reaction to complete the reaction without any unreacted acid anhydride compounds.

As the second ethylenically unsaturated monomer, the ethylenically unsaturated monomer (a)(ii) may be used for preparing the carboxyl and hydroxyl group containing polymer (a). Preferred monomer (a)(ii) is the monomer having one ethylenically unsaturation and 3 to 15, particularly 2 to 12 carbon atoms. The ethylenically unsaturated monomer having a hydroxyl group may further be employed as the monomer (a) (ii). In this case, it is used for further introducing a hydroxyl group into the polymer (a). It is preferred that the hydroxyl group is present at terminal end of the monomer, because such a monomer impart a good reactivity to the resulting coating composition.

More than two monomers may also be used in combination in order to improve a compatibility with other polymer. Specific examples of the monomer include ethylenically unsaturated monomers such as stylene, α-methylstyrene, (meth)acrylates (e.g., methyl (meth)acrylate, ethyl (meth)acrylate, propyl (meth)acrylate, n-, i- and t-butyl (meth)acrylate, 2-ethylhexyl (meth)acrylate, lauryl (meth)acrylate and cyclohexyl (meth)acrylate and the like), "VeoVa-9" and "VeoVa-10" available from Shell Chemical Co. The ethylenically unsaturated monomers having a hydroxyl group such as 2-hydroxyethyl (meth)acrylate, 4-hydroxybutyl (meth)acrylate and the hydroxyalkyl (meth)acrylates represented by the formula [I] can be employed. However, other monomers than the hydroxyalkyl (meth)acrylates represented by the formula [I] are preferred.

The ethylenically unsaturated monomer mixture comprising an ethylenically unsaturated monomer having a carboxyl group and a hydroxyalkyl (meth)acrylate (a)(i) and the copolymerizable ethylenically unsaturated monomer (a)(ii) of the present invention may be polymerized by the usual solution polymerization procedure. The preferred condition for polymerization is 3 to 8 hours of reaction time at a temperature of 100° to 150° C. by the use of an azoic or peroxidic radical polymerization initiator. Copolymerization ratio of the monomer mixture (a)(i) and the ethylenically unsaturated monomer (a)(ii) is within the range of, generally 20 to 100%, preferably 40 to 80% by weight/generally 0 to 80%, preferably 20 to 60% by weight.

If the amount less than 20% by weight of the monomer mixture (a)(i) is employed, the resulting composition may have insufficient curability. If the amount more than 80% by weight of the ethylenically unsaturated monomer (a)(ii) is employed, the functionality of the resulting composition decrease, and the composition may also has insufficient curability.

By radical polymerizing the monomeric composition comprising the above described monomers and the prior art radical polymerization initiator such as t-butyl peroxy-2-ethylhexyl hexanoate and dimethyl 2,2'- azobisisobutylate, the carboxyl and hydroxyl group containing polymer (a) is obtained.

In the case of the polymerization, the monomeric ingredients, i.e., the ethylenically unsaturated monomer mixture (a)(i) and the copolymerizable ethylenically unsaturated monomer (a)(ii), may be blended in an predetermined amount each other. However, another blending process which takes advantage of above described half esterification procedure may be employed.

That is, to complete the reaction without any unreacted acid anhydride compounds, it is general that an excess of hydroxyalkyl (meth)acrylates is used in the half esterification reaction. Thus, when the hydroxyalkyl (meth)acrylate is employed for the ethylenically unsaturated monomer having a hydroxyl group of the present invention, the hydroxyalkyl (meth)acrylate preferably be used in the half esterification reaction in an amount equivalent for the acid anhydride groups plus excess amount for the polymerization, to provide the ethylenically unsaturated monomer mixture comprising the ethylenically unsaturated monomer having a carboxyl group, and the hydroxyalkyl (meth)acrylate (a)(i).

Preferably, the molar ratio of hydroxyl group to anhydride group used for the half esterification of the hydroxyalkyl (meth)acrylate and the anhydride group containing compound is within the range of 1/0.9 to 1/0.5, more preferably 1/0.8 to 1/0.5. If the molar ratio of hydroxyl group to anhydride group is lower than 1/0.9, too long reaction time is required for the half esterification and the monomers used may be gelled. If the ratio is higher than 1/0.5, curability of the resulting coating composition becomes insufficient due to the lack of a carboxylic funcutionality.

The resulting monomer mixture (a)(i) alone, or optionally the ethylenically unsaturated monomer (a)(ii) therewith is polymerized according to the above described procedure to provide the hydroxyl and carboxyl group containing polymer (a) of the present invention.

In the case of the polymerization, 20 to 100%, preferably 40 to 80% by weight of the monomer mixture (a)(i) and 0 to 80%, preferably 20 to 60% by weight of the ethylenically unsaturated monomer (a)(ii) is employed. If the amount less than 20% by weight of the monomer mixture (a)(i) is employed, curability becomes insufficient.

According to the procedure described above, the hydroxyl and carboxyl group containing polymer (a) of the present invention generally having the following formula is provided:

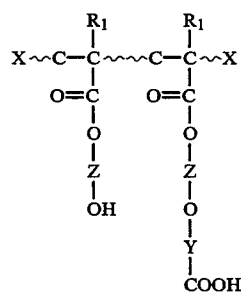

wherein, X represents a structural unit derived from the radical polymerization initiator, R₂ represents a hydrogen atom or a methyl group, Y represents a residue of the anhydride group containing compound having 8 to 12, preferably 8 to 10 carbon atoms, Z represents divalent group of the formula:

wherein, m, n and q represent the same integer as defined above.

The backbone of the polymer above has, for example, a repeating unit of the following formula:

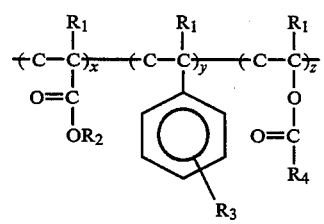

wherein, x, y and z represents any integer, R₁ is the same group as defined above, R₂ and R₄ represents a linear or branched alkyl group having generally 2 to 15, preferably 2 to 12 carbon atoms, R₃ represents a hydrogen, or a linear or branched alkyl group having generally 1 to 8, preferably 1 to 4 carbon atoms, provided each structural units being randomly arranged.

The hydroxyl and carboxyl group containing polymer (a) of the present invention preferably has a number average molecular weight between 1500 to 20000, preferably 2000 to 10000, more preferably 2000 to 5000. If the molecular weight is less than 1500, the functionality per molecule decreases and the resulting composition may have insufficient curability. If the molecular weight is more than 20000, the compatibility of the resulting polymer may deteriorate.

The hydroxyl and carboxyl group containing polymer of the present invention preferably has a hydroxyl value between 20 to 250, more preferably 25 to 200 mgKOH/g, and an acid value between 50 to 200, more preferably 70 to 180 mgKOH/g based on the solid content.

If the hydroxyl value is less than 20 mgKOH/g, the resulting composition may have insufficient curability. If the hydroxyl value is more than 250 mgKOH/g, the compatibility of the resulting polymer may deteriorate. If the acid value is less than 50 mgKOH/g, the resulting composition may have insufficient curability. If the hydroxyl value is more than 200 mgKOH/g, the water resistance of the cured composition may deteriorate because of the remaining unreacted carboxyl groups. The molecular weight of the polymer employed in the present invention is a number average molecular weight (Pin), which is determined by GPC method.

The carboxyl and carboxylate group containing polymer (b) employed in the curable resin composition of the present invention is a polymer having a half ester group which is prepared by reacting an anhydride group containing polymer (b)(i) with a hydroxyl group containing compound (hydroxyl compound)(b)(ii).

The anhydride group containing polymer (b)(i) is prepared by copolymerizing 15 to 40%, preferably 15 to 30% by weight of an ethylenically unsaturated monomer having an anhydride group (b)(i)(1) and 60 to 85%, preferably 70 to 85% by weight of the other copolymerizable ethylenically unsaturated monomer (b)(i)(2). If the amount of the ethylenically unsaturated monomer (b)(i)(1) is less than 15% by weight, curability of the resulting coating composition may become insufficient. If the amount is more than 40% by weight, a hard and brittle coating having poor weather resistance may be provided. Examples of the ethylenically unsaturated acid anhydride include itaconic anhydride, maleic anhydride and citraconic anhydride.

The other copolymerizable ethylenically unsaturated monomer may be any monomer which do not adversely affect on the anhydride group, including the copolymerizable ethylenically unsaturated monomer (a)(ii) as explained in the carboxyl and hydroxyl group containing polymer (a other than hydroxyl functional monomers. It is preferred that the other ethylenically unsaturated monomer is a combination of styrene and the monomer. Styrene may preferably be used in an amount of 5 to 40% by weight based on the total monomer weight of a monomeric component for the polymer (b).

The polymerization may be conducted in a solution, for example, at a temperature of 100° to 150° C. for 3 to 8 hours by the use of the radical polymerization initiator. The resulting anhydride group containing polymer preferably has a number average molecular weight of 1,500 to 20,000, more preferably 2,000 to 10,000. If the number average molecular weight is more than 20,000, a viscosity of the polymer elevates and a high solid coating composition hardly be obtained. If the number average molecular weight is less than 500, curability of the resulting coating may be insufficient.

The polymer thus obtained has average at least two, preferably 2 to 15 anhydride groups per molecule. If the number of anhydride groups is average less than 2, the resulting resin composition may have poor curability. If the number is average more than 15, a hard and brittle coating having poor weather resistance may be provided.

The anhydride group containing polymer (b)(i) is then reacted with the hydroxyl compound (b)(ii) in a molar ratio of anhydride group to hydroxyl group of 1/1.5 to 1/1, preferably 1/1.5 to 1/1.3 to produce the carboxyl and carboxylate group containing polymer (b). If the molar ratio less than 1/1.5 is employed, an excessive alcohol may generate pinholes in the cured coating. If the molar ratio more than 1/1 is employed, the storage stability of the coating composition may be lowered due to unreacted anhydride groups.

Preferably, the hydroxyl compound (b)(ii) employed in the present invention is a volatile low molecular weight one and generally has 1 to 12, preferably 1 to 8 carbon atoms. Upon heating the carboxyl and carboxylate group containing polymer (b) for ring-closing the half-esterified anhydride group, a generated low molecular weight hydroxyl compound will volatile, and this removal of the hydroxyl compound out from the system ensures a high reproducibility of the ring-closed anhydride group in the polymer. Typical examples of the hydroxyl compound are methanol, ethanol, n-propanol, i-propanol, n-butanol, i-butanol, t-butanol, ethylene glycol monomethyl ether, ethylene glycol monoethyl ether, dimethylamino ethanol, diethylamino ethanol, acetol, allyl alcohol and propargyl alcohol. Preferred are acetol, allyl alcohol, propargyl alcohol and methanol.

The hydroxyl and epoxy group containing polymer (c) employed in the curable resin composition of the present invention preferably has average 2 to 10, more preferably average 3 to 8 epoxy groups, and average 2 to 12, preferably average 4 to 10 hydroxyl groups. It is preferred that the polymer (c) has an epoxy equivalent of 100 to 800, specifically 200 to 600, and a hydroxyl value of 200 to 1,200, specifically 400 to 1,000.

If the epoxy equivalent is more than 800, the resulting coating composition may have poor curability. If the epoxy equivalent is less than 100, the cured coating composition may become hard and brittle. If the hydroxyl value is less than 200, water resistance of the cured coating may deteriorate. If the hydroxyl value is more than 1,200, the resulting coating composition may have poor curability.

The hydroxyl and epoxy group containing polymer (c) is prepared by copolymerizing, 5 to 40%, preferably 15 to 30% by weight of the hydroxyalkyl (meth)acrylate (c)(i) of the formula [I], 10 to 60%, preferably 15 to 50% by weight of an ethylenically unsaturated monomer having epoxy group (c)(ii), and optionally 0 to 85%, preferably 10 to 60% by weight of the other copolymerizable ethylenically unsaturated monomer (c)(iii).

If the amount of the hydroxyalkyl (meth)acrylate (c)(i) is less than 5% by weight, curability of the resulting coating composition may become insufficient. If the amount is more than 40% by weight, the homogeneous polymerization may be deteriorated due to its poor compatibility. If the amount of the ethylenically unsaturated monomer having epoxy group (c)(ii) is less than 10% by weight, curability of the resulting coating composition may become insufficient. If the amount is more than 60% by weight, a hard and brittle coating having poor weather resistance may be provided.

The polymerization may be conducted by methods known to the art, for example, radical solution polymerization. It is generally conducted at a temperature of 100° to 150° C. for 3 to 8 hours by the use of the radical polymerization initiator. The radical polymerization initiator can be used in an amount of 3 to 15% by weight based on the total monomer weight. In the polymerization, an additive, such as chain transfer agent may be employed. The hydroxyl and epoxy group containing polymer (c) preferably has a number average molecular weight of 500 to 20,000, more preferably 1,500 to 10,000.

Typical examples of the hydroxyalkyl (meth)acrylate (c)(i) are 2-hydroxyethyl (meth)acrylate, 4-hydroxybutyl (meth)acrylate and Placcel FM-1 (a ring-open adduct of ε-caprolactone and 2-hydroxyethyl methacrylate available from Daicel Chemical Industries, Ltd.). Typical examples of the ethylenically unsaturated monomer having epoxy group (c)(ii) are glycidyl (meth)acrylate and 3,4-epoxycyclohexyl (meth)acrytate. The monomer (c)(iii) is the same as the copolymerizable ethylenically unsaturated monomer (a)(ii) as explained in the carboxyl and hydroxyl group containing polymer (a) other than hydroxyl functional monomers.

The curable resin composition of the present invention is prepared by mixing the above mentioned carboxyl and hydroxyl group containing polymer (a), carboxyl and carboxylate group containing polymer (b) and hydroxyl and epoxy group containing polymer (c).

The composition may be made in such an amount ratio that a molar ratio of total acid group in the polymer (a) and the polymer (b) to epoxy group in the polymer (c) is within the range of 1/1.2 to 1/0.6, preferably 1/1.0 to 1/0.8. If the molar ratio is more than 1/0.6, the cured coating has poor curability. If it is less than 1/1.2, the cured coating easily becomes yellow.

The composition may also be made in such an amount ratio that a molar ratio of total hydroxyl group in the polymers (a) and (c) to acid group in the polymer (b) is within the range of 1/1.5 to 1/0.5. If the amount ratio is more than 1/0.5, the resulting coating has poor curability. If it is less than 1/1.5, the cured coating composition has poor water resistance due to the presence of excess hydroxyl groups.

The above mentioned molar ratios can be easily calculated by the methods known to the art from hydroxyl value, acid value and epoxy equivalent of the employed polymers. It is preferred that the curable resin composition of the present invention contains 5 to 50%, preferably 5 to 40% by weight of the polymer (a), 20 to 60%, preferably 25 to 55% by weight of the polymer (b) and 30 to 60%, preferably 35 to 55% by weight of the polymer (c).

If the amount of polymer (a) is less than 5% by weight, mar resistance of the coating becomes poor, and is more than 50% by weight, too soft coating having poor acid resistance may be provided. If the amount of polymer (b) is less than 20% by weight, acid resistance of the coating becomes poor, and is more than 60% by weight., too hard coating may be provided. The polymer (c) is employed in a calculated amount corresponding to the total amount of carboxyl group in the resulting composition. If the amount of the polymer (c) is less than the calculated amount, curability of the coating composition becomes insufficient, and is more than the calculated amount, yellow resistance of the resulting coating may become poor.

According to the curable resin composition of the present invention, a carboxyl group and a carboxylate group in the polymer (b) are ring-closed upon heating to form an anhydride group and a low molecular weight free hydroxyl compound. The anhydride group then reacts with a hydroxyl group present in the polymer (a) or (c) to form a crosslinked bond to reproduce an acid group. The reproduced acid group in the polymer (b) or an acid group present in the polymer (a) reacts with an epoxy group present in the polymer (c) to form another crosslinked bond. As the result, the three polymers (a), (b) and (c) are crosslinked together and proceed curing. The low molecular weight free hydroxyl compound which have been produced with the anhydride group is removed by evaporation upon heating.

In the present composition, it is believed that, since both the hydroxyl group in the polymer (c) and the carboxyl group in the polymer (a) are relatively apart from their polymer backbones and have high degree of freedom of molecular motion adjacent to crosslinked bonds, the cured coating film has high breaking strength and exhibits excellent mar resistance.

The curable resin composition of the present invention may further contain a curing catalyst for promoting the reaction between acid and epoxy. Typical examples of the curing catalysts are quaternary ammonium salts, such as benzyltriethylammonium chloride or bromide, tetrabutylammonium chloride or bromide, tetrabutylammonium salicylate or glycolate; sulfonates, such as p-toluenesulfonate and the like.

The curing catalyst may be present in the resin composition in an amount of 0.1 to 2.0% by weight based on the solid content of the resin composition. The curing catalyst may be combined with tin catalysts which are art-known (see Japanese Kokai Publications 151651/1990 and 279713/1990). Examples of the tin catalysts are dimethyltin bis(methyl maleate), dimethyltin bis(ethyl maleate), dimethyltin bis(butyl maleate), dibutyltin bis(butyl maleate) and the like. An amount ratio of curing catalyst/tin catalyst may be within the range of 1/0.5 to 1/4.

The resin composition may also contain melamine-formaldehyde resin and/or blocked isocyanate, in order to enhance crosslinking density and water resistance, Further, a UV absorber, a hindered amine light stabilizer and anti oxidizing agent may be added to enhance weather resistance. The composition may also contain other additives, such as rheology controlling agent (e.g. crosslinked resin particles), surface controlling agent. In order to adjust viscosity of the resin composition, a diluent (e.g. alcohols, such as methanol, ethanol, propanol and butanol; hydrocarbon; esters) may be added thereto.

The resin composition has carboxyl groups which are neutralized with amine to make the composition water-dispersible or water-soluble, The resin composition may be formed into aqueous resin composition.

The curable resin composition of the present invention is suitably used for a clear coating composition. The clear coating composition is generally applied on a base coating layer formed from a base coating composition which is either aqueous or solvent-borne and contains color pigment. It is also preferred that the clear coating composition is applied on the base coating layer without curing the base coating layer and then the composite layer is baked to cure (two-coat one-bake curing system).

In case where the aqueous base coating composition is employed in tho two-coat one-bake system, the base coating layer, if necessary, is heated at 60° to 100° C. for 2 to 10 minutes before coating the clear coating composition. The base coating composition is generally explained in U.S. Pat. Nos. 5,151,125 and 5,183,504 which are herein incorporated. Especially, the aqueous coating composition disclosed in U.S. Pat. No. 5,183,504 is suitable in view of finish appearance and film performance.

The curable resin composition may be prepared by art-known methods, for example as enamel paint mixing ingredients by kneader or roll.

The resin composition may be applied on a substrate by spraying, brushing, dipping, roll coating, flow coating and the like. The substrate can be any one, including wood, metal, glass, fabric, plastics, plastic foam and the like. Preferred are plastics, metals (e.g. steel and aluminum) and alloys thereof. The substrate may be primed or intercoated by art-known methods if necessary.

The coated coating layer is generally cured by heating at a temperature of 100° to 180° C. preferably 120° to 160° C. Curing time may be varied by curing temperature, but generally for 10 to 30 minutes at a temperature of 120° to 160° C.

The film thickness of the resulting coating layer may be varied depending upon its usage, but in many cases within the range of 0.5 to 3 mil.

EXAMPLES

The present invention is illustrated by the following Examples which, however, are not to be construed as limiting the present invention to their details. The amounts herein used are "parts by weight", unless otherwise indicated.

Preparative Examples 1 to 16

Preparative Examples 1 to 16 illustrate a preparation of the hydroxyl and carboxyl group containing polymers (a) employed in the curable resin composition of the present invention.

Preparative Examples 1 to 5 illustrate a preparation of the ethylenically unsaturated monomer mixture comprising the ethylenically unsaturated monomer having a carboxyl group, and the hydroxyalkyl (meth)acrylate (a)(i) which is a precursor of the hydroxyl and carboxyl group containing polymer.

Preparative Example 1

A reaction vessel equipped with a thermometer, a stirrer, a cooling tube, a nitrogen inlet tube and a dropping funnel was charged with 360 parts of Arco solve PMA (Kyowa Yuka K. K.), 777 parts of 4-hydroxybutyl acrylate, 665 parts of hexahydrophthalic anhydride and 0.48 parts of hydroquinone monomethyl ether. A temperature of the content was raised to 145° C. and held over 20 minutes. The reaction mixture was then cooled and evacuated from the vessel to provide the ethylenically unsaturated monomer mixture comprising the ethylenically unsaturated monomer having a carboxyl group, and the hydroxyalkyl (meth)acrylate A-i.

Preparative Examples 2 to 5

The ethylenically unsaturated monomer mixture comprising the ethylenically unsaturated monomer having a carboxyl group, and the hydroxyalkyl (meth)acrylate A-i to A-v were prepared according to the procedure described for preparative example 1, except using the compositions tabulated in the following Table 1.

Preparative examples 6 to 16 illustrate a preparation of the hydroxyl and carboxyl group containing polymers (a).

Preparative Example 6

A reaction vessel equipped with a thermometer, a stirrer, a cooling tube, a nitrogen inlet tube and a dropping funnel was charged with 300 parts by weight of xylene and 200 parts of Arco solve PMA (Kyowa Yuka K. K.), and a temperature of the content was raised to 130° C. To the reaction vessel was dropwise added 1300 parts by weight of the monomer mixture A-i prepared in preparative example 1 and 100 parts by weight of t-butylperoxy-2-ethyl hexanoate over 3 hours. The content was stand 30 minutes at 130° C., and it was then cooled and evacuated from the vessel to provide the hydroxyl and carboxyl group containing polymer A-I.

The polymer A-I is clear liquid having a solid content of 54%, a number average molecular weight of 2000, an acid value and a hydroxyl value based on solid of 168 mgKOH/g and 42 mgKOH/g respectively.

Preparative Examples 7 to 16

The hydroxyl and carboxyl group containing polymers A-II to A-XI were prepared according to the procedure described for preparative example 6, except using the compositions tabulated in the following Table 2. Properties of the resulting polymers are also indicated below.

TABLE 1

| Preparative example no. | 1 | 2 | 3 | 4 | 5 |
|---|---|---|---|---|---|
| Obtained monomer no. | A-i | A-ii | A-iii | A-iv | A-v |
| Arco solve PMA | 360 | 376 | 354 | 379 | 398 |
| Hydroxyalkyl acrylate | 4HBA[1) | 4HBA | 4HBA | 4HBMA[2) | 6HHA[3) |
|  | 777 | 777 | 777 | 852 | 928 |
| Anhydride containing compound | HHPA[6) | 4MHHPA[4) | PhAn[5) | HHPA | HHPA |
|  | 665 | 725 | 639 | 665 | 665 |
| Hydroquinone monomethyl ether | 0.48 | 0.50 | 0.47 | 0.50 | 0.53 |
| Solid contennt (%) | 80 | 80 | 80 | 80 | 80 |

[1)]4-Hydroxybutyl acrylate
[2)]4-Hydroxybutyl methacrylate
[3)]6-Hydroxyhexyl acrylate
[4)]4-Methylhexahydrophthalic anhydride
[5)]Phthalic anhydride
[6)]Hexahydrophthalic anhydride

TABLE 2

| Preparative example no. | 6 | 7 | 8 | 9 | 10 | 11 | 12 | 13 | 14 | 15 | 16 |
|---|---|---|---|---|---|---|---|---|---|---|---|
| Obtained polymer no. | A-I | A-II | A-III | A-IV | A-V | A-VI | A-VII | A-VIII | A-IX | A-X | A-XI |
| Xylene | 300 | 150 | 100 | 300 | 100 |  | 400 | 250 | 100 | 100 | 250 |
| A sol. *8 | 200 | 350 | 400 | 200 | 400 | 500 | 300 | 250 | 400 | 400 | 250 |
| Starting monomer no. | A-i (PEx. 1) | A-i (PEx. 1) | A-i (PEx. 1) | A-i (PEx. 1) | A-i (PEx. 1) | A-i (PEx. 1) | A-i (PEx. 1) | A-ii (PEx. 2) | A-iii (PEx. 3) | A-iv (PEx. 4) | A-v (PEx. 5) |
| amount | 1300 | 1300 | 1300 | 910 | 1300 | 650 | 910 | 800 | 800 | 600 | 1000 |
| Stylene |  |  |  |  |  |  |  | 200 |  | 200 |  |
| 4HBA*1 |  |  |  | 359 |  |  |  | 200 |  | 200 |  |
| 4HBMA*2 |  |  |  |  |  | 562 |  |  |  |  |  |
| CHMA*3 |  |  |  |  |  |  |  | 62 |  |  | 150 |
| EHA*4 |  |  |  |  |  |  |  |  | 100 | 200 |  |
| VeoVa-9*5 |  |  |  |  |  |  | 250 |  | 300 |  | 150 |
| VeoVa-10*6 |  |  |  | 312 |  |  |  |  |  |  |  |
| KEO*7 | 100 | 70 | 50 | 100 | 135 | 100 | 100 | 100 | 100 | 100 | 100 |
| Xylene | 100 | 100 | 100 | 100 | 210 | 100 | 100 | 100 | 100 | 100 | 100 |
| KEO | 10 | 10 | 10 | 10 | 10 | 10 | 10 | 10 | 10 | 10 | 10 |
| Mn | 2000 | 3000 | 5000 | 2000 | 2000 | 2200 | 1900 | 2100 | 2000 | 2200 | 2200 |
| Acid value (mgKOH/g) | 168 | 168 | 168 | 117.6 | 124.5 | 80.8 | 117.6 | 108.1 | 105.2 | 71.0 | 110.6 |
| OH value | 42 | 42 | 42 | 29.4 | 131.2 | 204.6 | 29.4 | 101.9 | 26.3 | 89.8 | 27.6 |

TABLE 2-continued

| Preparative example no. | 6 | 7 | 8 | 9 | 10 | 11 | 12 | 13 | 14 | 15 | 16 |
|---|---|---|---|---|---|---|---|---|---|---|---|
| (mgKOH/g) Solid content (%) | 54 | 54.0 | 54.0 | 56.0 | 58.0 | 59.0 | 51.0 | 57.0 | 57.2 | 59.0 | 57.0 |

*[1] 4-Hydroxybutyl acrylate
*[2] 4-Hydroxybutyl methacrylate
*[3] Cyclohexyl methacrylate
*[4] 2-Ethylhexyl acrylate
*[5] Available from Shell Chemical Co.
*[6] Available from Shell Chemical Co.
*[7] t-Butylperoxy-2-ethyl hexanoate
*[8] Arco solve PMA available from Kyowa Yuka K.K.

Preparative Examples 17 to 22

Preparative Examples 17 to 22 illustrate a preparation of the carboxyl and carboxylate group containing polymers (b) employed in the curable resin composition of the present invention.

Preparative Examples 17 to 19 illustrate a preparation of the anhydride group containing polymer (b)(i) which is a precursor of the carboxyl and carboxylate group containing polymer.

Preparative Example 17

A reaction vessel equipped with a thermometer, a stirrer, a cooking tube, a nitrogen inlet tube and a dropping funnel was charged with 80 parts by weight of xylene, and its temperature was raised to 115° C. To the reaction vessel was dropwise added a monomer and initiator solution consisting of 25 parts by weight of stylene, 21 parts by weight of n-butyl acrylate, 95 parts by weight of n-butyl methacrylate, 34 parts by weight of 2-ethylhexyl methacrylate, 50 parts by weight of itaconic anhydride, 100 parts by weight of propylene glycol monomethyl ether acetate and 10 parts by weight of t-butyl peroxy-2-ethylhexyl hexanoate over 3 hours. The content was mixed 2 hours, and then cooled and evacuated from the vessel to provide the anhydride group containing polymer B-i having a solid content of 53%, and a number average molecular weight of 5,500.

Preparative Example 18 and 19

The anhydride group containing polymers B-ii and B-iii were prepared according to the procedure described for preparative example 17, except using the compositions tabulated in the following Table 3. Properties of the resulting polymers are also indicated below.

TABLE 3

| Preparative example no. | 17 | 18 | 19 |
|---|---|---|---|
| Obtained polymer no. | B-i | B-ii | B-iii |
| Solvesso 100[2] | | 100 | 66 |
| Xylene | 80 | | |
| Stylene | 25 | 30 | 10 |
| Methyl methacrylate | — | — | 30 |
| 2-Ethylhexyl acrylate | | 65 | 25 |
| 2-Ethylhexyl methacrylate | 34 | 45 | 30 |
| Butyl acrylate | 21 | 15 | — |
| Butyl methacrylate | 95 | — | 45 |
| Itaconic anhydride | 50 | | |
| Maleic anhydride | | 45 | 60 |
| PGMEA[3] | 100 | 90 | 120 |
| KEO[2] | 10 | 7 | 10 |
| Solid content | 53 | 52 | 53 |

TABLE 3-continued

| Preparative example no. | 17 | 18 | 19 |
|---|---|---|---|
| Mn | 5,500 | 7,000 | 5,000 |

[1] Aromatic hydrocarbon solvent available from Esso Chemical Co.
[2] t-Butylperoxy-2-ethyl hexanoate
[3] Propylene glycol monomethyl ether acetate Preparative Example 20 to 22 illustrate a preparation of the carboxyl and carboxylate group containing polymer.

Preparative Example 20

The anhydride group containing polymer B-i prepared from preparative example 17 (385 parts by weight) was reacted with 18.2 parts by weight of methanol for 24 hours at 65° C. to prepare the carboxyl and carboxylate group containing polymer B-I. A disappearance of the absorbance derived from an anhydride group (1785 cm$^{-1}$) was confirmed by the infrared spectroscopy.

Preparative Example 21 and 22

The carboxyl and carboxylate group containing polymers B-II and B-III were prepared according to the procedure described for preparative example 20, except using the compositions tabulated in the following Table 4.

TABLE 4

| Preparative example no. | 20 | 21 | 22 |
|---|---|---|---|
| Obtained polymer no. | B-I | B-II | B-III |
| Starting polymer no. (amount) | B-i 385 | B-ii 372 | B-iii 375 |
| Hydroxyl compound | methanol | acetol | methanol |
| amount | 18 | 37 | 22 |

Preparative Examples 23 to 25

Preparative Examples 23 to 25 illustrate a preparation of the hydroxyl and epoxy group containing polymer employed in the curable resin composition of the present invention.

Preparative Example 23

A reaction vessel equipped with a thermometer, a stirrer, a cooling tube, a nitrogen inlet tube and a dropping funnel, was charged with 500 parts by weight of butyl acetate and heated to 125° C.

To the reaction vessel was dropwise added a monomer and initiator solution consisting of 50 parts by weight of styrene, 400 parts by weight of glycidyl methacrylate, 350 parts by weight of 4-hydroxybutyl acrylate, 200 parts by weight of 2-ethylhexyl acrylate and 70 parts by weight of t-butylperoxy-2-ethyl hexanoate over 3 hours. The content was kept at 125° C. for 30 minutes, to which a mixture consisting of 10 parts by weight of t-butylperoxy-2-ethyl hexanoate and 250 parts by weight of xylene was added dropwise over 30 minutes. The reaction was continued at 125° C. for 2 hours to obtain a colorless transparent varnish solution comprising the hydroxyl and epoxy group containing polymer C-I. The polymer C-I has a number average molecular weight of 4000, a hydroxy equivalent weight of 411 and an epoxy equivalent weight of 355.

Preparative Examples 24 and 25

The hydroxyl and epoxy group containing polymers C-II and C-III were prepared according to the procedure described for preparative example 23, except using the compositions tabulated in the following Table 5. Properties of the resulting polymers are also indicated below.

TABLE 5

| Preparative example no. | 23 | 24 | 25 |
|---|---|---|---|
| Obtained polymer no. | C-I | C-II | C-II |
| Precharged solvent(amount) | BA[2) (500) | xylene(450) butanol(50) | xylene(450) butanol(50) |
| Stylene | 50 | 390 | 30 |
| Glycidyl methacrylate | 400 | 320 | 400 |
| 4-Hydroxybutyl acrylate | 350 | | |
| 4-Hydroxybutyl methacrylate | | 50 | 440 |
| 2-Ethylhexyl acrylate | 200 | 240 | 130 |
| KEO[1) | 80 | 50 | 80 |
| Xylene | 250 | 250 | 250 |
| Epoxy equivalent weight (g solid) | 355 | 444 | 355 |
| Hydroxy equivalent weight (g solid) | 411 | 654 | 327 |
| Mn | 4,000 | 7,000 | 4,000 |
| Solid content (%) | 59 | | |

[1)t-Butylperoxy-2-ethyl hexanoate
[2)Butyl acetate

Examples 1 to 18

Examples 1 to 18 illustrate coating compositions containing the polymers which were prepared in preparative examples 1 to 25.

Example 1

A resin composition was prepared by mixing the following ingredients:

| Ingredients | Amount |
|---|---|
| Polymer A-I (PEx. 1) | 25.0 |
| Polymer B-I (PEx. 22) | 225.0 |
| Polymer C-I (PEx. 29) | 160 |
| Tetrabutylammonium bromide | 1.3 |
| Tinubin-900 | 2.6 |
| Sanol LS-292 | 1.3 |
| Summary | 415.2 |

The resulting composition was diluted with a solvent mixture of butyl acetate/xylene (1/1) to a coatable viscosity to obtain a clear coating composition. A phosphated steel panel was intercoated with Power Top U-30 (electrodeposition paint available from Nippon Paint Co., Ltd.) and Orga P-2 (intercoating paint available from Nippon Paint, Co., Ltd.). It was then base-coated with a metallic base paint (Super Lack M-90 available from Nippon Paint Co., Ltd.) and then further coated with the above obtained clear coating composition in the form of wet-on-wet. The coated panel was baked at 140° C. for 30 minutes. The resulting cured coating film was evaluated as follows and the results obtained are shown in Table 7.

Evaluations (1) Coating stability: The resulting clear coating composition was stand for 1 week at a room temperature. When any translucency and phase separation was not observed by visual inspection, the coating composition was evaluated as "Good".

(2) Pencil hardness: The cured coating film was evaluated according to JIS K 5400-979.

(3) Warm water resistance: A cured coating film was dipped in warm water at 40° C. for 10 days and then its appearance was observed by visual inspection.

(4) Alkali resistance: The cured coating film was contacted with 0.2 ml of a 0.1N NaOH aqueous solution at 55° C. for 4 hours, and then observed by visual inspection.

(5) Acid resistance: The cured coating was contacted with 0.2 ml of a 0.1N $H_2SO_4$ aqueous solution at 55°0 to 60° C. for 2 hours and then observed by visual inspection according to the following criteria.

| No change | ⊙ |
|---|---|
| Slightly changed | ○ |
| Definitely changed | △ |

(6) Mar resistance: One gram of a 50% cleanser water solution (available from Kao Corp. as New Homing Cleanser containing 87% by weight of abrasive particles, 5% by weight of surfactant and the others) was coated on a flannel fabric (2×2 cm) and attached to a fastness tester of the fraction of colored fabric (available from Daiei Kagaku Seiki K. K.). The cured coating film was rubbed with the fabric go and back 10 times at a load of 500 g, and then 20° G. gloss was measured by a gloss meter (available from Suga Shikenki K. K.) before and after rubbing, and its change was expressed by percentage. The percentage is generally related to eye evaluation according to the following criteria.

| >90 | No change |
|---|---|
| 80 to 90 | Slight change but hardly to recognize |
| 70 to 80 | Recognizable change |
| 70> | Definite change |

Examples 2 to 15

Clear coating compositions were prepared as generally described in Example 1, except using the compositions tabulated in the following Table 6, and the same evaluations as Example 1 were conducted. The results were shown in Table 7.

Example 16 to 18

As base coating, three compositions were prepared as generally described in Examples 1 to 3, at column 9, line 16 to column 10, line 6 of U.S. Pat. No. 5,183,504.

A phosphated steel panel was intercoated as described in Example 1, and spray-coated with each of the above mentioned three base coating composition. After pre-heating at 60° C. for 5 minutes, it was coated with the clear coating composition obtained in Example 1 and then cured at 140° C. for 30 minutes. The same evaluations as Example 1 were conducted and the results are shown in Table 7.

As is shown in Table 7, the clear coating composition of the present invention has excellent acid resistance and mar resistance.

Comparative Examples 1 and 2

Clear coating compositions were prepared as generally described in example 1, except using the compositions tabulated in the following Table 6, and the same evaluation as Example 1 were conducted. The results were shown in Table 7.

TABLE 6

| Example no. | Polymer (a) | Polymer (b) | Polymer (c) | Curing cat. | Additives | |
|---|---|---|---|---|---|---|
| 2 | A-II (PEx. 7) 25 [6.1]*1 | B-I (PEx. 20) 225 [54.9] | C-I (PEx. 23) 160 [39] | TBABr*2 1.3 | TN 900*3 2.6 | LS-292*4 1.3 |
| 3 | A-III (PEx. 8) 25 [6.3] | B-I (PEx. 20) 225 [56.3] | C-I (PEx. 23) 150 [37.5] | TBABr 1.3 | TN 900 2.6 | LS 292 1.3 |
| 4 | A-IV (PEx. 9) 25 [6.3] | B-I (PEx. 20) 225 [56.3] | C-I (PEx. 23) 150 [37.5] | TBABr 1.3 | TN 900 2.6 | LS 292 1.3 |
| 5 | A-V (PEx. 10) 150 [27.2] | B-I (PEx. 20) 150 [27.2] | C-I (PEx. 23) 250 [45.5] | TBABr 1.3 | TN 900 2.6 | LS 292 1.3 |
| 6 | A-VI (PEx. 11) 25 [5.7] | B-I (PEx. 20) 225 [51.1] | C-I (PEx. 23) 190 [43.2] | TBABr 1.3 | TN 900 2.6 | LS 292 1.3 |
| 7 | A-VII (PEx. 12) 25 [6.3] | B-I (PEx. 20) 225 [56.3] | C-I (PEx. 23) 150 [37.5] | TBABr 1.3 | TN 900 2.6 | LS 292 1.3 |
| 8 | A-VIII (PEx. 13) 25 [6.3] | B-I (PEx. 20) 225 [56.3] | C-I (PEx. 23) 150 [37.5] | TBABr | TN 900 | LS 292 |
| 9 | A-IX (PEx. 14) 200 [42.1] | B-I (PEx. 20) 100 [21.0] | C-I (PEx. 23) 175 [36.8] | TBABr 1.3 | TN 900 2.6 | LS 292 1.3 |

*1 The values rounded by "[]" indicates a combination ratio of the polymers.
*2 Tetrabutylammonium bromide
*3 Tinubin 900 available from Ciba Geigy A.G.
*4 Sanol LS 292 available from Sankyo Co., Ltd.

TABLE 7

| | Coating stability | Pencil hardness | Warm water resist. | Alkali resist. | Acid resist. | Mar resist. |
|---|---|---|---|---|---|---|
| Example | | | | | | |
| 1 | Good | H | Good | Good | ⊙ | 85 |
| 2 | Good | H | Good | Good | ⊙ | 85 |
| 3 | Good | H | Good | Good | ⊙ | 88 |
| 4 | Good | H | Good | Good | ⊙ | 75 |
| 5 | Good | F | Good | Good | ○ | 73 |
| 6 | Good | H | Good | Good | ⊙ | 90 |
| 7 | Good | H | Good | Good | ⊙ | 70 |
| 8 | Good | H | Good | Good | ⊙ | 83 |
| 9 | Good | F | Good | Good | ○ | 68 |
| 10 | Good | H | Good | Good | ⊙ | 70 |
| 11 | Good | F | Good | Good | ○ | 65 |
| 12 | Good | F | Good | Good | ○ | 73 |
| 13 | Good | F | Good | Good | ○ | 72 |
| 14 | Good | F | Good | Good | ○ | 69 |
| 15 | Good | F | Good | Good | ○ | 91 |
| 16 | — | H | Good | Good | ⊙ | 85 |
| 17 | — | H | Good | Good | ⊙ | 85 |
| 18 | — | H | Good | Good | ⊙ | 85 |
| Comp. Ex. | | | | | | |
| 1 | Good | H | Good | Good | ○ | 54 |
| 2 | Good | F | Good | Good | △ | 45 |

What is claimed is:

1. A curable resin composition comprising:

(a) 5 to 50% by weight of a carboxyl and hydroxyl group containing polymer prepared by copolymerizing, (i) 20 to 100% by weight of an ethylenically unsaturated monomer mixture comprising (1) an ethylenically unsaturated monomer having a carboxyl group and (2) a hydroxyalkyl (meth)acrylate of the formula:

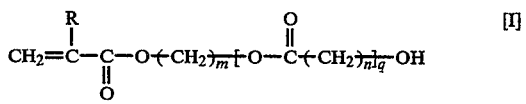

wherein, R represents a hydrogen atom or a methyl group, m represents an integer of 2 to 8, n represents an integer of 3 to 7 and q represents an integer of 0 to 4, said monomer mixture (i) being prepared by mixing and reacting the hydroxyalkyl (meth)acrylate with an anhydride group containing compound in an molar ratio of hydroxyl group to anhydride group of 1/0.9 to 1/0.5, and optionally (ii) 0 to 80% by weight of a copolymerizable ethylenically unsaturated monomer;

(b) 20 to 60% by weight of a carboxyl and carboxylate group containing polymer prepared by reacting, (i) an anhydride group containing polymer prepared by copolymerizing 15 to 40% by weight of (1) an ethylenically unsaturated monomer having an anhydride group and 60 to 85% by weight of (2) the other copolymerizable ethylenically unsaturated monomer, with (ii) a hydroxyl group containing compound having 1 to 12 carbon atoms in a molar ratio of anhydride group to hydroxyl group of 1/1.5 to 1/1; and (c) 30 to 60% by weight of a hydroxyl and epoxy group containing polymer prepared by copolymerizing, (i) 5 to 40% by weight of said hydroxyalkyl (meth)acrylate, (ii) 10 to 60% by weight of an ethylenically unsaturated monomer having an epoxy group, and optionally (iii) 0 to 85% by weight of the other copolymerizable ethylenically unsaturated monomer.

2. The curable resin composition according to claim 1, wherein the carboxyl and hydroxyl group containing polymer (a) is prepared by the use of the hydroxyalkyl (meth)acrylate (a)(i)(2) having a structure of the formula:

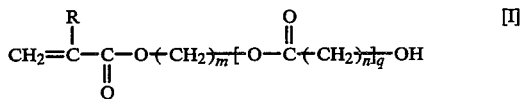

[I]

wherein, R represents a hydrogen atom or a methyl group, m represents an integer of 2 to 6, n represents 5 and q represents an integer of 0 to 2.

3. The curable resin composition according to claim 1, wherein the carboxyl and hydroxyl group containing polymer (a) is prepared by the use of the anhydride group containing compound which generates a carboxyl group when heated in the range of from room temperature to 120° C. in the presence of a hydroxyl group.

4. The curable resin composition according to claim 3, wherein an anhydride group of the anhydride group containing compound is a saturated or unsaturated cyclic anhydride group having 8 to 12 carbon atoms.

5. The curable resin composition according to claim 1, wherein the carboxyl and hydroxyl group containing polymer (a) is prepared by copolymerizing, 40 to 80% by weight of the ethylenically unsaturated monomer mixture (a)(i) and 20 to 60% by weight of the copolymerizable ethylenically unsaturated monomer (a)(ii).

6. The curable resin composition according to claim 1, wherein the carboxyl and hydroxyl group containing polymer (a) has a number average molecular weight of 2,000 to 5,000, a hydroxyl value based on solid of 10 to 250 mgKOH/g, and an acid value based on solid of 70 to 180 mgKOH/g.

7. The curable resin composition according to claim 1, wherein the carboxyl and carboxylate group containing polymer (b) has a number average molecular weight of 2,000 to 10,000, and has average 2 to 15 anhydride groups per molecule.

8. The curable resin composition according to claim 1, wherein the anhydride group containing polymer (b)(i) is prepared by copolymerizing 15 to 30% by weight of the ethylenically unsaturated monomer having an anhydride group (b)(i)(1), and 70 to 85% by weight of the copolymerizable ethylenically unsaturated monomer (b)(i)(2).

9. The curable resin composition according to claim 1 or 8, wherein the anhydride group containing polymer (b) is prepared by reacting, the anhydride group containing polymer (b)(i), with the hydroxyl group containing compound (b)(ii) in a molar ratio of anhydride group to hydroxyl group of 1/1.5 to 1/1.3.

10. The curable resin composition according to claim 9, wherein the hydroxyl group containing compound (b)(ii) has 1 to 8 carbon atoms.

11. The curable resin composition according to claim 1, wherein the hydroxyl and expoxy group containing polymer (c) is prepared by copolymerizing, 5 to 30% by weight of the hydroxyalkyl (meth)acrylate (c)(i), 15 to 50% by weight of the ethylenically unsaturated monomer having an epoxy group (c)(ii), and 10 to 60% by weight of the copolymerizable ethylenically unsaturated monomer (c)(iii).

12. The curable resin composition according to claim 1, wherein the hydroxyl and expoxy group containing polymer (c) has a number average molecular weight of 2,000 to 10,000, an epoxy equivalent weight of 200 to 600 and a hydroxyl value of 400 to 1,000, and has average 3 to 8 epoxy groups and 4 to 10 hydroxyl groups per molecule.

13. The curable resin composition according to claim 1 comprising, 5 to 40% by weight of the carboxyl and hydroxyl group containing polymer (a), 25 to 55% by weight of the carboxyl and carboxylate group containing poller (b), and 35 to 55% by weight of the hydroxyl and epoxy group containing polymer (c).

14. The curable resin composition according to claim 1, wherein a molar ratio of total acid group in the polymer (a) and the polymer (b) to epoxy group in the polymer (c) is within the range of 1/1.2 to 1/0.6, and a molar ratio of total hydroxyl group in the polymers (a) and (c) to acid group in the polymer (b) is within the range of 1/1.5 to 1/0.5.

15. The curable resin composition in accordance with claim 1 comprising (d) a quaternary ammonium salt as catalyst.

16. The curable resin composition in accordance with claim 1 comprising (e) an organic tin compound as catalyst.

17. A coating composition comprising, as film-forming component, the curable resin composition in accordance with claim 1.

* * * * *